United States Patent [19]

Stelly

[11] Patent Number: 4,574,241

[45] Date of Patent: Mar. 4, 1986

[54] MARINE SURVEYING APPARATUS AND METHOD FOR LOCATING PIPELINES BURIED UNDER THE SEABED

[76] Inventor: C. L. Jack Stelly, P.O. Box 53353, Lafayette, La. 70505

[21] Appl. No.: 525,017

[22] Filed: Aug. 22, 1983

[51] Int. Cl.$^4$ .......... G01V 3/165; E21B 7/12; E21B 7/26; E02D 21/00

[52] U.S. Cl. ............ 324/326; 175/5; 175/23; 175/40; 324/345; 405/201

[58] Field of Search ........... 324/326, 345, 346, 200; 114/264–266; 166/65 M; 175/19, 21, 23, 40, 50, 5, 7, 10; 405/195, 201–203, 227

[56] References Cited

U.S. PATENT DOCUMENTS

| | | | |
|---|---|---|---|
| 3,027,951 | 4/1962 | Knapp et al. | 324/200 UX |
| 3,419,090 | 12/1968 | Van Dorn | 114/264 X |
| 3,707,197 | 12/1972 | Walesch et al. | 175/50 X |
| 3,722,604 | 3/1973 | Lesher | 175/19 |
| 4,033,056 | 7/1977 | Demmers | 405/201 X |

*Primary Examiner*—Gerard R. Strecker
*Attorney, Agent, or Firm*—Pravel, Gambrell, Hewitt & Kimball

[57] ABSTRACT

A marine pipeline surveying apparatus useful for locating buried pipelines includes a barge having a work deck with a dolly mounted on the work deck for movement on the deck upon a provided track. A slot in the barge can be provided so that workers can move completely around the dolly. The dolly provides a gimbal type articulating support for supporting a hollow casing during operation. The gimbal support allows the articulating movement to compensate wave action on the barge so that the wave action is not transmitted to the casing. During operation a magnetometer placed in the casing bore can be used to "roughly" position the barge and casing above the pipeline to be located. Then the barge can be anchored in position over the pipeline as dictated by the magnetometer "rough" positioning. The magnetometer is then removed from the casing bore and the casing provides a guide for a probe rod such as a jet probe which is placed within the casing. The probe can then repeatedly penetrate the seabed to locate the buried pipeline by physically contacting the pipeline thereby giving both plan and profile position of the pipeline.

13 Claims, 9 Drawing Figures

MARINE SURVEYING APPARATUS AND METHOD FOR LOCATING PIPELINES BURIED UNDER THE SEABED

BACKGROUND OF THE INVENTION

1. Technical Field

The present invention relates to marine surveying devices, and more particularly relates to devices for locating undersea pipelines by probing of the seabed. Even more particularly, the present invention relates to a marine surveying apparatus for locating pipelines buried under the seabed using a work platform such as a barge supporting a hollow casing which can be adjustably positioned above the pipeline so that repetitive multi-position probing through the casing into the seabed can locate the pipeline by physically contacting it.

2. General Background

The field of surveying involves not only the general land surveying art but also marine surveying which is often referred to as "hydrographic" surveying. Marine surveying involves, for example, the use of depth finders, fathometers, and magnetometers in combination with positioning equipment to give a plan and/or profile position of offshore oil rigs, buried or underwater pipelines, well heads, and undersea ditches in which pipe is to be laid.

One of the problems in surveying for undersea pipelines is the problem of locating those pipelines which are buried. It is desirable to not only locate such a pipeline by plotting the plan view of the pipeline as it traverses a tract of seabed, but it is also valuable to know the pipeline profile, or the amount of soil which covers the pipeline. A lack of proper "cover" can mean an exposed pipeline which is subject to damage by dredging, anchoring, saltwater corrosion, erosion, current and the like. If the pipeline is a high pressure gas pipeline or an oil pipeline, there exists a great danger to persons and the environment if the pipeline is damaged. Buried pipelines cannot usually be accurately plotted unless physical contact with the pipeline is made. This contact is usually by means of a probe rod. A probe rod is an elongated, structural element which is usually tubular and which is thrust into the earth until the tip of the rod strikes the pipeline. If the pipe is buried very deep, the probe rod can be hollow and provided with a water jet at its tip or other such jetting means so that it will penetrate the seabed easily. Usually, the probe rod is an elongated tubular structure such as a section of one-half inch to three inch ($\frac{1}{2}''$–3'') pipe having a hollow bore. Water for jetting can be supplied to the probe rod by a hose connection to a water pump. In an offshore environment, probe rods can be very long and can be difficult to support and handle. For example, if a pipeline is located in twenty-five feet of water and buried under the seabed an additional five feet, the pipeline lies thirty feet beneath the water surface. In order to reach the pipeline and have some of the probe rod exposed so that workers on a barge or boat can handle it, a probe rod would be preferably thirty-five to forty feet in length to locate such a pipeline located thirty feet below water surface.

The problem of support of a probe rod by workers on a boat can be unexpectedly compounded by wave action which acts upon the hull of the vessel occupied by the surveyors. The probe rod is preferably supported in a vertical direction so that a surveying instrument such as a transit, or theodalite can sight the top of the probe rod in order to determine position of the pipeline. A problem exists in that long probe rods are very difficult to vertically orient for surveyors standing on the deck of a work platform such as a boat or a barge. Thus, the elongated probe rods become a source of error for the survey if they are not supported in a vertical fashion. Another problem is the weight of the probe rod itself. Probe rods of, for example, forty feet in length when filled with water and when attached to jetting hoses and the like can become very heavy requiring a number of workers to both support the pipe and to properly align it so that each penetration of the seabed can be made in order to search for the pipeline. This cumbersome process becomes quite expensive and time-consuming when the exact position of the pipeline is not known and the probe rod must be thrust into the seabed over and over until the tip of the probe rod strikes the pipeline.

GENERAL DISCUSSION OF THE PRESENT INVENTION

The present invention provides a marine surveying apparatus for locating pipelines buried under the seabed. In the preferred embodiment, a barge is provided with a work deck which surrounds a vertical slot in the barge. A track is provided on either side of the slot and a dolly is movably supported upon the spaced apart, generally parallel tracks. The dolly supports a gimbal with a central opening receptive of a casing during operation so that wave movement acting upon the barge does not cause a corresponding movement of the casing. Rather, movement of the casing is minimized. The barge provides means for locking the dolly, the casing and gimbal in a particular desired position. The casing has an internal bore into which can be placed an electronic or like surveying device such as a magnetometer. A magnetometer is an instrument for measuring the magnitude and sometimes also the direction of a magnetic field. Such devices are commercially available. The magnetometer would be preliminarily positioned within the casing bore. The casing could then be positioned very close to the undersea pipeline using the magnetometer. After this initial positioning of the casing, a probe such as a jet probe is placed within the casing bore and can then be vertically moved within the casing bore. The probe can then be repeatedly thrust into the seabed until the buried pipeline was located with the tip of the probe by simply striking the hard pipeline with the probe. By knowing the length of the probe and by registering the tip of the probe with the existing pipeline, a plan and profile survey of the existing pipeline can be made. The pipline can be "located" in this manner in several linear positions or stations along its length to plot its course. During repeated attempts to probe the seabed at a particular station, the dolly can be moved a small distance at a time upon the track so that very precise increments can be successfully probed. During the probing operation, the barge is preferably anchored so that the barge is stationary with respect to the underlying seabed. During the probing operation, the dolly can be moved along the tracks and with respect to the barge so that adjustability of the probe in a lateral direction is achieved. The slot is preferably in the central portion of the deck and the tracks are parallel to each other and placed on opposite sides of the slot. A lifting frame can be attached to the dolly for supporting the vertical load component of the jetting probe.

BRIEF DESCRIPTION OF THE DRAWINGS

For a further understanding of the nature and objects of the present invention, reference should be had to the following detailed description, taken in conjunction with the accompanying drawings, in which like parts are given like reference numerals and wherein.

DETAILED DESCRIPTION OF THE PRESENT INVENTION

Figure 1:
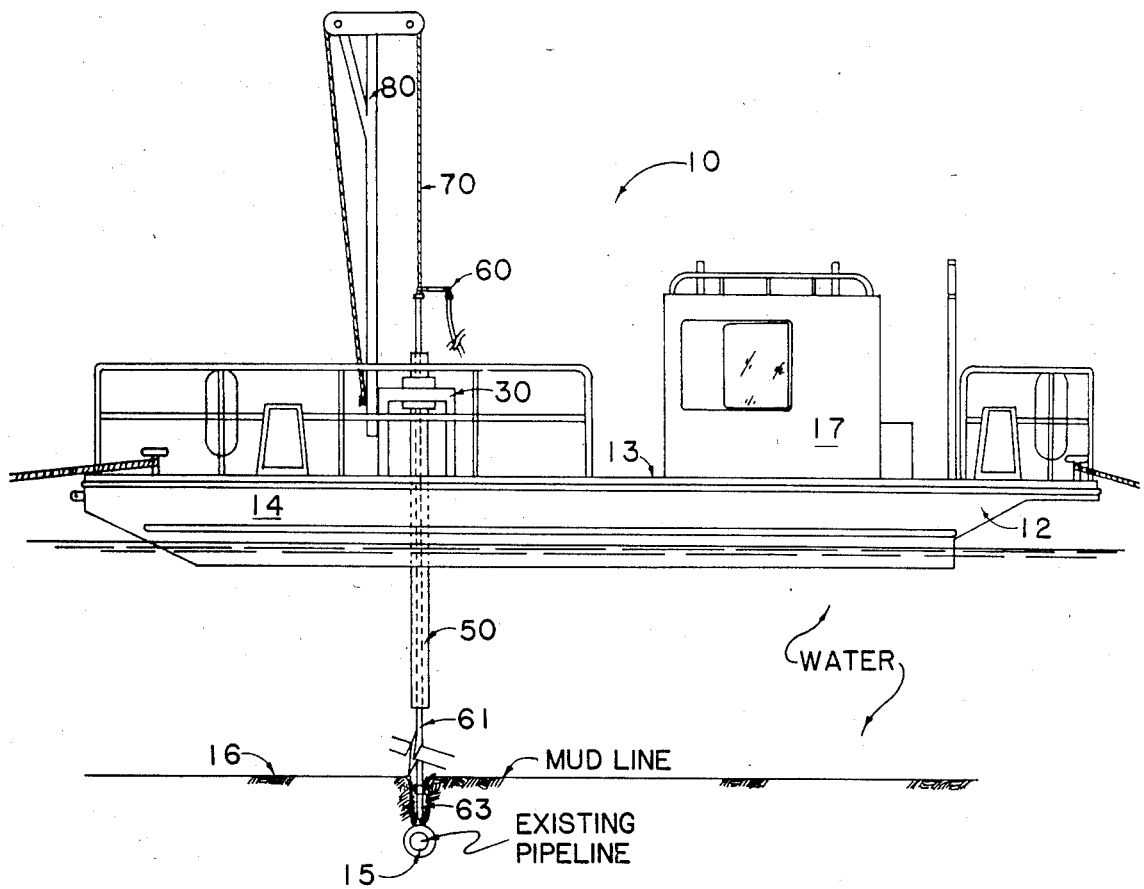
FIG. 1 is an elevational view of the preferred embodiment of the apparatus of the present invention.
Figure 2:
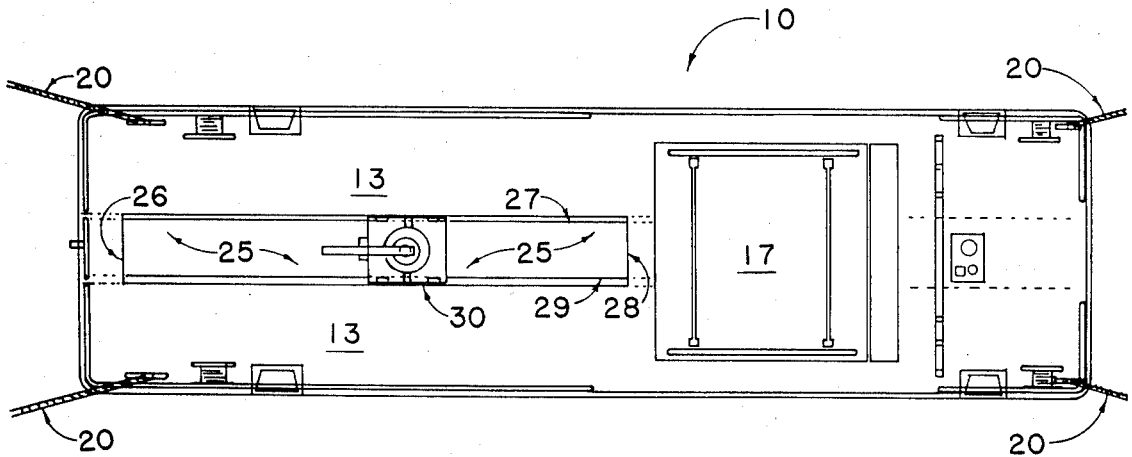
FIG. 2 is a top plan view of the preferred embodiment of the apparatus of the present invention.
Figure 3:
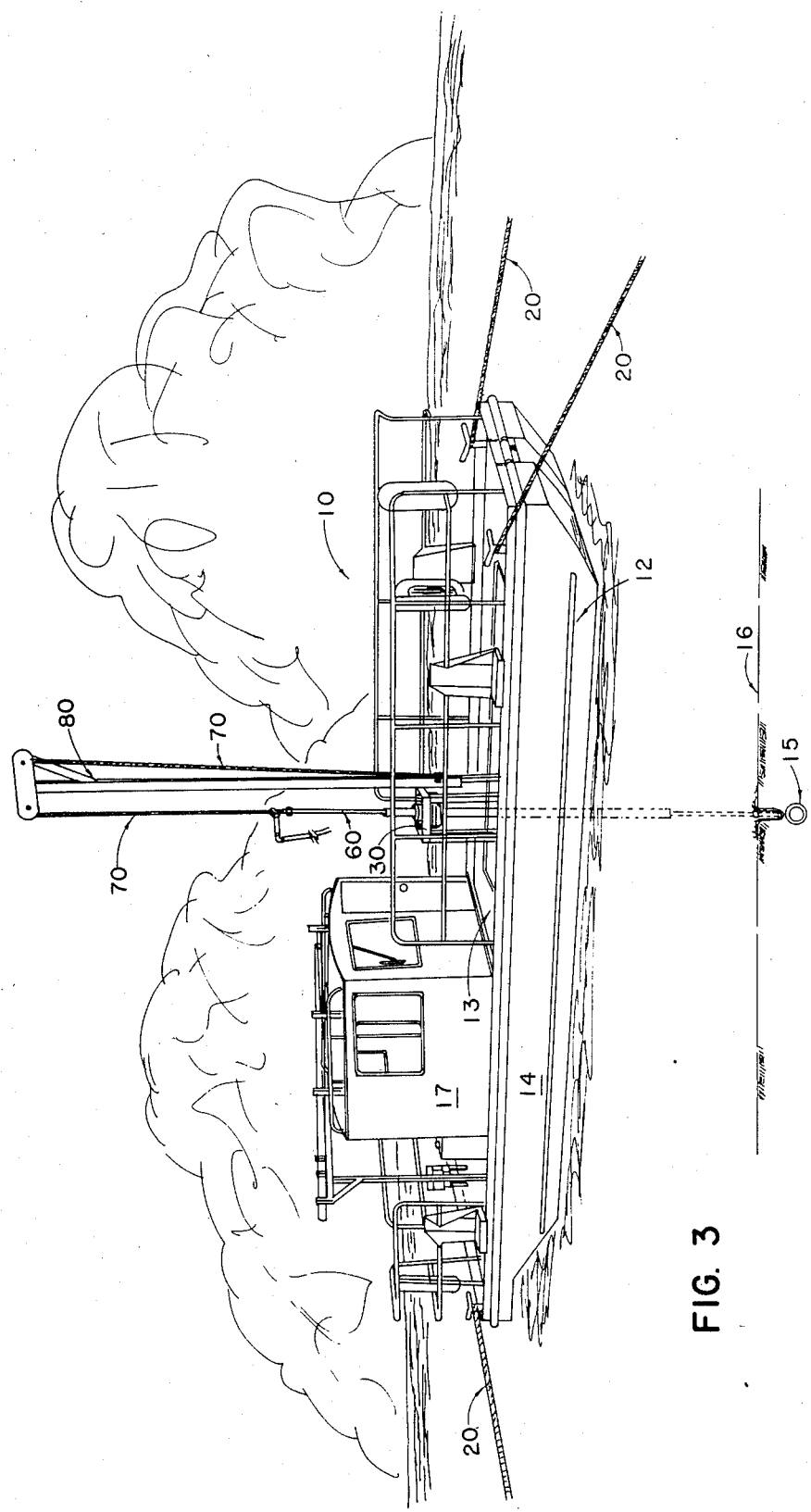
FIG. 3 is a perspective view of the preferred embodiment of the apparatus of the present invention.

FIGS. 1-3 show the preferred embodiment of the apparatus of the present invention designated generally by the numeral 10. In the preferred embodiment, marine pipeline surveying apparatus 10 includes barge 12 having deck 13 and hull 14 supporting cabin 17. Barge 12 can be floated into position above a submerged buried pipeline 15 to be located as part of a survey. Barge 12 can locate the general area of pipeline 15 using information such as old maps, or construction information generated when pipeline 15 was built. Barge 12 is preferably anchored in position in an area of seabed 16 where pipeline 15 might be located using a plurality of anchors. Anchor lines 20 are used to secure barge 12 with respect to seabed 16 so that probing for pipeline 15 can be repeatedly attempted in the same general area.

Figure 5:
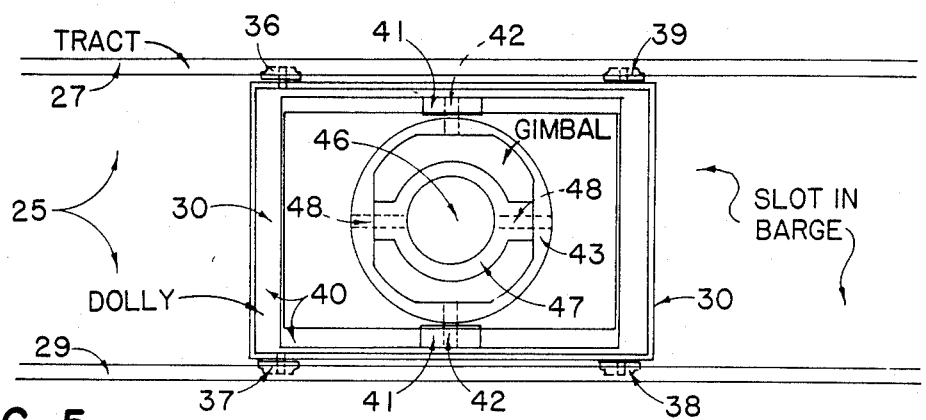
FIG. 5 is a top view of the dolly portion of the preferred embodiment of the apparatus of the present invention.
Figure 6:
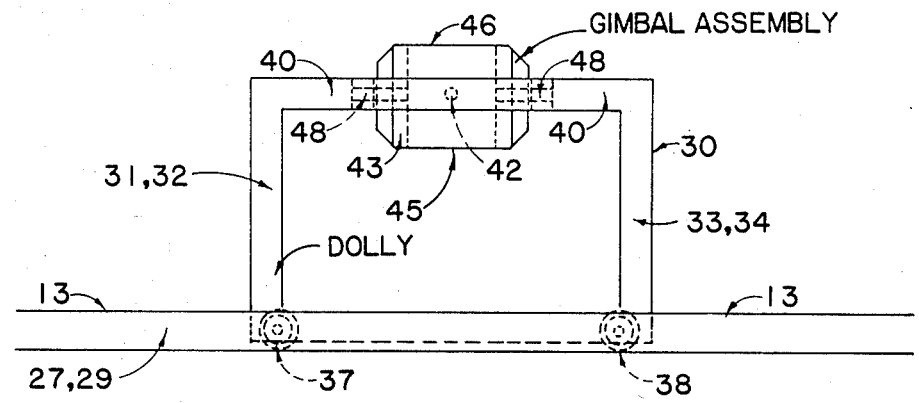
FIG. 6 is a side view of the dolly portion of the preferred embodiment of the apparatus of the present invention.
Figure 7:
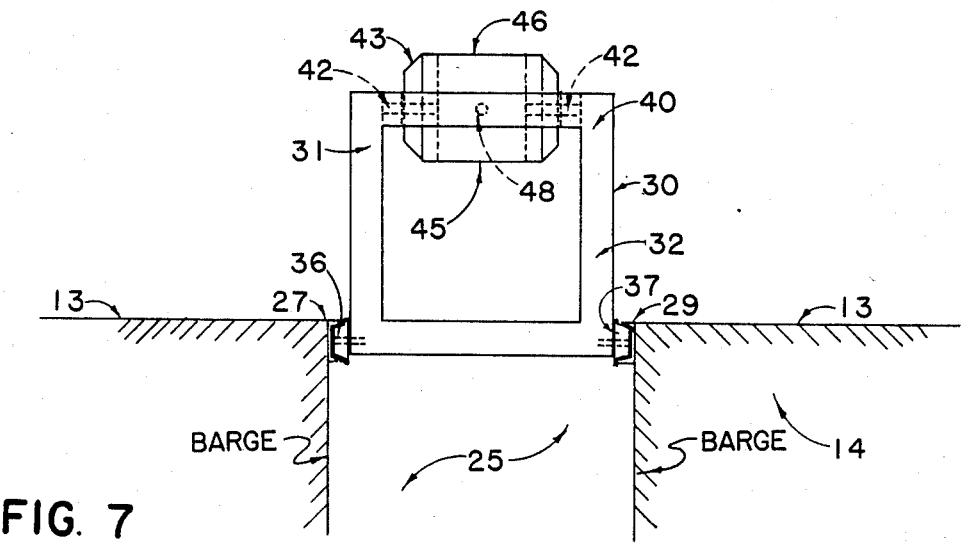
FIG. 7 is an end view of the dolly portion of the preferred embodiment of the apparatus of the present invention.

Barge 12 has a longitudinal preferably rectangular slot 25 extending from its deck 13 through the hull 14. Slot 25 is preferably centrally located so that crewmembers and surveyors can walk upon deck 13 and all around slot 25 substantially three hundred sixty degrees (360°). A pair of spaced apart, parallel rails 27, 29 are affixed to hull 14 at slot 25 by welding for example to provide a firm structural support. Rails 27, 29 are positioned on opposite sides of slot 25, and can be located at the upper part of slot 25 adjacent deck 13 (see FIG. 7). Rails 27, 29 provide a supporting runway for wheeled dolly 30. Dolly 30 travels upon its casters 36-39 between end portions 26-28 of slot 25. Pipeline 15 is first generally located using magnetometer 57 which is positioned within the bore of casing 50 (see FIG. 4A). Barge 12 is then positioned so that the pipeline is transverse with slot 25. Thus, lateral movement of dolly 30 gives lateral probing dimension substantially equal to the length of the slot 25. During operation, probing could begin by positioning the dolly 30 at the center of slot 25 using the magnetometer. Probing could then proceed in either lateral direction towards either end 26 or 28. Dolly 30 would be moved a distance smaller than the diameter of the pipeline being searched so that successive probes would not fall on either side of pipeline 15. Dolly 30 is best seen in FIGS. 5-7. Dolly 30 has four legs 31-34, each leg attached at the upper end portion to gimbal frame 40, and at the lower end portion respectively to casters 36-39. Gimbal 45 is supported by frame 40. Gimbal 45 attaches to frame 40 at bearings 41 which receive rotatably shafts 42. Shafts 42 rotatably support a first portion 43 of gimbal 45. Thus full articulating movement is possible between casing 50 (when it occupies opening 46) and barge 12. The effect of this articulating connection is that wave action upon barge 12 is minimally transmitted to casing 50. A central opening 46 in gimbal 45 receives casing 50 during operation. Casing 50 has a central bore which allows insertion of an elongated probing pipe section of a provided jetting probe rod assembly 60 thereinto, with the casing acting as a guide for the probe rod during probing as will be discussed more fully hereinafter.

Dolly 30 travels upon rails 27, 29 between end positions 26, 28 of slot 25. This travel defines a survey area which can be repeatedly probed while searching for pipeline 15. Normally barge 15 would be preliminarily positioned so that slot 25 transversely crossed pipeline 15. Lateral movement of dolly 30 upon tracks 27, 29 can place dolly 30 and thus casing 50 in a plurality of different, spaced apart probing positions. Dolly 30 can be clamped into any position along its path of travel on track 27, 29 and between end portions 26, 28 of slot 25 where probing is desired.

A lifting frame 80 can be supported above frame 40 to aid in the handling of jetting probe rod assembly 60. Lifting frame 80 provides an elongated superstructure 82 having one end 84 mounted on dolly 30. The other end 88 of lifting frame 80 supports load line 70 which attaches to and supports jetting probe assembly. Casing 50 has a bore 55 which forms a guide for the elongated probing pipe section of probe rod assembly 60 and also for magnetometer 57. The magnetometer would be placed within casing 50 preliminarily to position casing 50 over pipeline 15.

Figure 4:
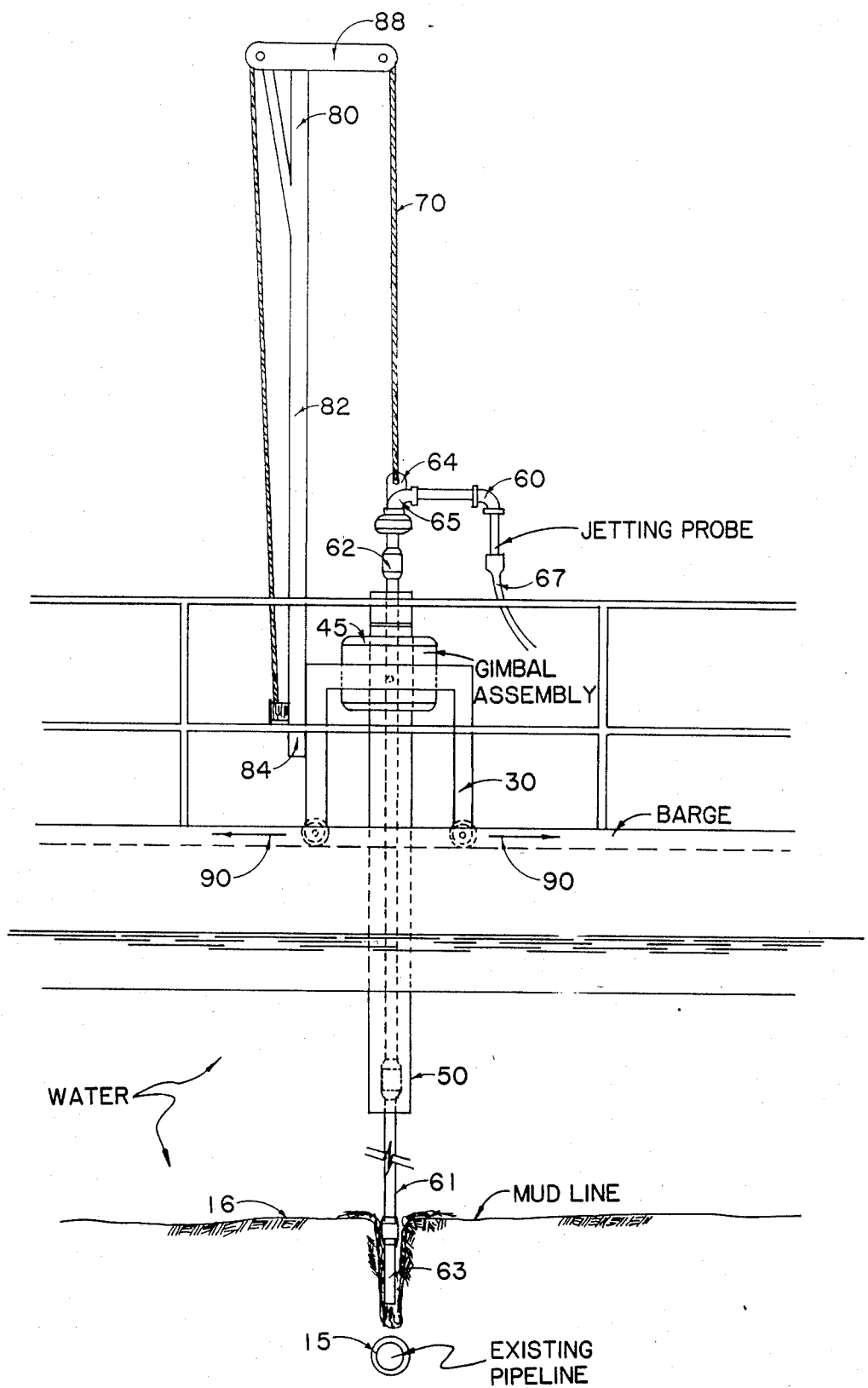
FIG. 4 is a partial, elevational view of the preferred embodiment of the apparatus of the present invention illustrating the dolly and jetting assembly portions thereof.
Figure 4A:
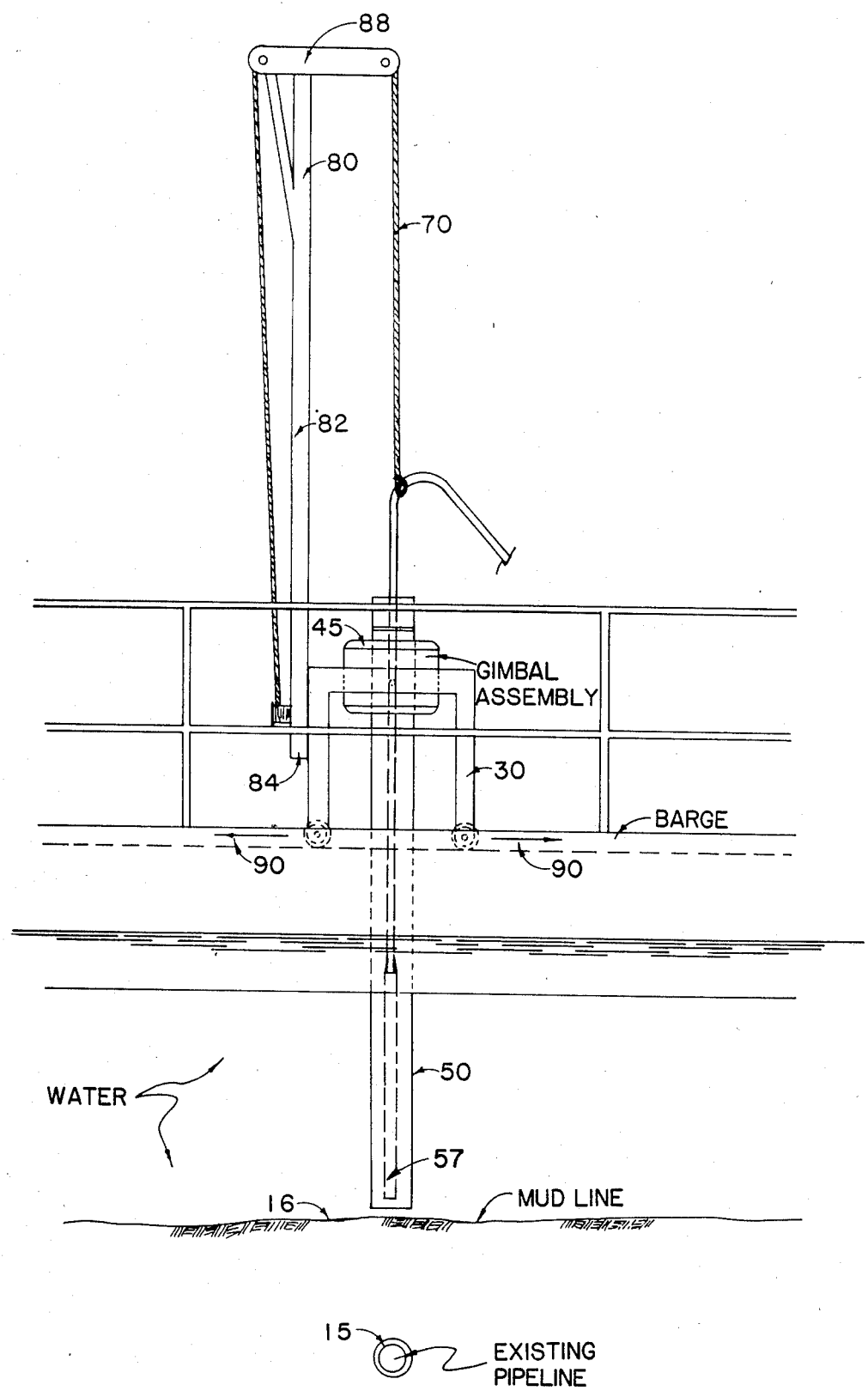
FIG. 4A is a partial, elevational view of the preferred embodiment of the apparatus of the present invention illustrating preliminary location of a buried pipeline with a magnetometer placed within the casing.
Figure 8:
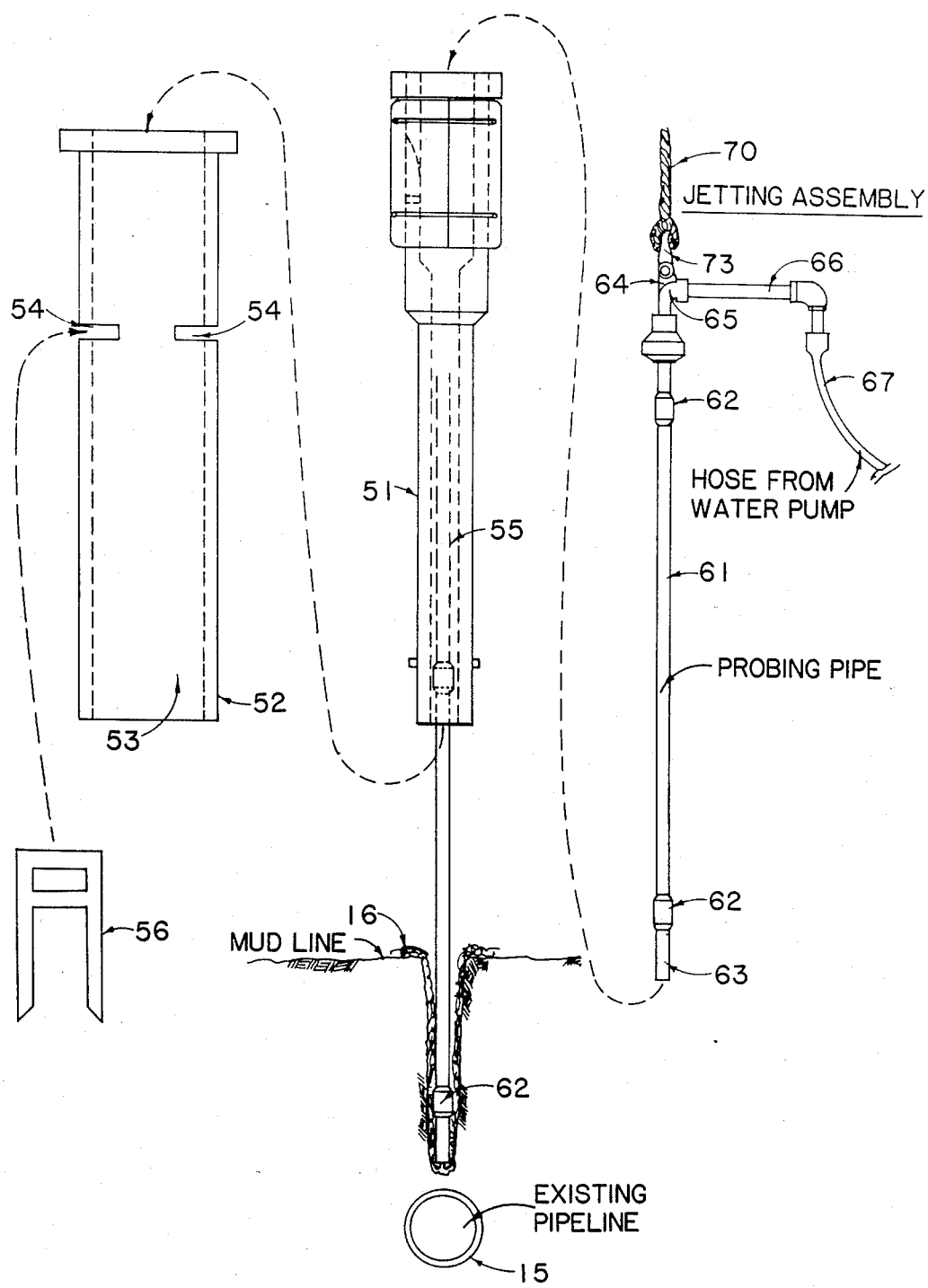
FIG. 8 is an exploded, schematic view of the jetting assembly portion of the preferred embodiment of the apparatus of the present invention.

FIGS. 4, 4A and 8 show more particularly the construction of jetting assembly 60. Jetting assembly 60 provides an elongated tubular section 61 which could be, for example, one-half to three ($\frac{1}{2}''$ to 3'') inch pipe.

A plurality of sections of pipe 61 could be attached end to end by connecting them together at joints 62. A lowermost jetting tip 63 would also attach by means of a joint connection 62 to the pipe sections 61. An uppermost shackle 73 or other suitable lifting eye would be attached to padeye 64 which would be welded, for example, to elbow 65 which connects with spoolpiece 66. Hose 67 supplies water from a water pump or the like through spool piece 66 and into pipe section 61. Casing 50 comprises an inner casing 51 and an outer casing 52. Casing 52 provides an inner bore 53 and a pair of transverse slots 54 which are opposed and on opposite sides of the casing 52 wall. The outer diameter of outer casing 52 is substantially equal to the inner diameter of opening 46 of gimbal 45. A removable holding fork 56 cooperates with the pair of transverse slots 54 so as to secure inner casing 51 in its position inside bore 53 of outer casing 52. Inner casing 51 also provides an inner bore 55 which is receptive of the pipe sections 61 of jetting assembly 60.

During operation, casing assembly 50 is supported by gimbal assembly 45. Frame 80 is used for the purpose of lifting the entire jetting assembly 60 in order to remove it from the gimbal assembly 45 after probing is completed. In order to probe for a section of an existing pipeline 15, the jetting probe assembly 60 is lifted and lowered repeatedly using lifting frame 80, Since frame 80 is attached to and moves with dolly 30 in its lateral directions as shown by the arrows 90 in FIG. 4, the load line 70 always assumes a position vertically above the bore 55 of inner casing 51. The dolly 30 would be moved laterally a distance at a time in search of pipeline 15. For example, if pipeline 15 were a twelve inch diameter pipeline, dolly 30 would be advanced for example eight inches at a time. At each distance interval, loadline 70 would be used to lower jetting assembly 60 downwardly and more particularly the jetting tip 63 portion thereof so that it could penetrate the seabed 16 in search of pipeline 15 (see FIG. 4). By moving in distance increments which are smaller than the diameter of the pipeline, the pipeline will eventually be struck.

Once the pipeline is in fact contacted, survey information can be gained as to its plan and profile position. The depth of the pipeline from the water surface can be determined by measuring the length of probe rod which has been thrust into the seabed. For example, the pipe sections 61 could be marked with numbers indicating the length of the rod from the tip to the uppermost end portion. Further, positioning for use in a plan view of the pipeline can be made by sighting the top of the probe assembly 60 with a transit or theodalite or the like. Electronic positioning equipment can also be used to give position of the barge if desired once the pipeline 15 is physically contacted.

Because many varying and different embodiments may be made within the scope of the inventive concept herein taught, and because many modifications may be made in the embodiments herein detailed in accordance with the descriptive requirements of the law, it is to be understood that the details are to be interpreted as illustrative and not in a limited sense.

What is claimed as invention is:

1. A marine surveying apparatus for locating hidden pipelines buried a distance under the seabed, comprising:
   a. a barge having a work deck which can be supported above the pipeline to be located;
   b. a transverse track mounted on the barge work deck;
   c. a dolly movably supported on the track so that the dolly can move transversely upon the track and with respect to the barge;
   d. a casing supported during operation in a generally vertical position by the dolly for transverse movement with the dolly and with respect to the barge;
   e. surveying means positioned adjacent the casing for preliminarily determining the location of the pipeline so that both the barge and the casing can be positioned close to the undersea pipeline to be located;
   f. probe means vertically movable within and laterally supported by the casing so that the casing guides the probe means;
   g. and means supported at least in part by said barge and connected to said probe means allowing repeated lifting and lowering of said probe means so that the probe means can repeatedly penetrate the seabed to locate the buried pipeline by physical contact with the hidden pipeline.

2. The marine surveying apparatus of claim 1, wherein the barge has a generally vertical slot in its deck and the track is positioned at the slot.

3. The marine surveying apparatus of claim 1 further including connection means for forming an articulating support between the dolly and the casing.

4. The marine surveying apparatus of claim 1, wherein the positioning means is a magnetometer removably positioned in the casing preliminarily until the casing is positioned vertically above the buried pipeline to be located.

5. The marine surveying apparatus of claim 1, wherein the probe means is an elongated jetting probe.

6. The marine surveying apparatus of claim 3, wherein the connection means is a gimbal mounted upon the dolly.

7. A method of marine surveying for hidden pipelines that are buried under the seabed, comprising the steps of:
   a. preliminarily determining the approximate location of the pipeline;
   b. vertically positioning a casing above the pipeline to be located with a marine vessel having a laterally adjustable support that holds the casing in a vertical position;
   c. movably supporting an elongated probe rod with the casing so that the probe rod can be elevated and lowered along a generally vertical path defined by the casing;
   d. thrusting the probe rod downwardly through the casing and into the underlying seabed while the casing laterally supports the probe rod;
   e. sequentially moving the casing position with the adjustable support into a number of laterally spaced preselected prospective sites to be probed until the pipe is contacted by the probe so that the pipeline horizontal elevation and the location at the probe site can be measured, each prospective site being surveyed by thrusting the probe rod downwardly through the casing and into the underlying seabed.

8. The method of claim 7 wherein in step "a" the casing is supported by a marine vessel using an articulating support connection between the vessel and the casing so that wave action upon the vessel has a minimized effect upon the casing.

9. The method of claim 7 wherein in step "a" a dolly on the vessel supports the casing and in step "c" the casing position is laterally adjusted by movement of the dolly with respect to the vessel.

10. The method of claim 7, wherein in step "a" an electronic instrument carried by the casing locates the pipeline so that the casing can be positioned above it.

11. The method of claim 10, wherein in step "a" the casing is hollow and the electronic instrument is placed inside the casing during positioning of the casing above the buried pipeline.

12. The method of claim 10 or 11 wherein the electronic instrument is a magnetometer.

13. The method of claim 9, wherein in step "a" an articulated connection carried by the dolly supports the casing.

* * * * *